United States Patent [19]

Howell, Jr.

[11] 4,155,434
[45] May 22, 1979

[54] ELECTRIC CONDUCTOR SYSTEM FOR RAPID TRANSIT RAILWAYS

[76] Inventor: Alleyne C. Howell, Jr., 645 Mine Hill Rd., Fairfield, Conn. 06430

[21] Appl. No.: 686,911

[22] Filed: May 17, 1976

[51] Int. Cl.² .......................... B60M 1/30; B60L 5/38
[52] U.S. Cl. .................................. 191/22 R; 104/246; 191/45 R; 191/49; 191/57; 191/59.1
[58] Field of Search .................... 191/22 R, 29 R, 32, 191/45 R, 48, 49, 57, 59.1; 246/65, 73, 254; 104/246

[56] References Cited

U.S. PATENT DOCUMENTS

| | | | |
|---|---|---|---|
| 3,672,308 | 6/1972 | Segar | 104/246 |
| 3,786,762 | 1/1974 | Corkum | 191/49 |
| 3,847,256 | 11/1974 | Zurek | 191/49 |

*Primary Examiner*—Trygve M. Blix
*Assistant Examiner*—Reinhard J. Eisenzopf
*Attorney, Agent, or Firm*—H. Gibner Lehmann; K. Gibner Lehmann

[57] ABSTRACT

A rail electrification system for electric railways utilizing 3-phase power, comprising three conductor rails arranged in a group characterized by a staggered relationship, commonly known as a delta configuration, so that two of the rails face in one direction and the third faces in an opposite direction. For taking off the 3-phase power from the conductor rails, the car is equipped with two sets of three collectors or shoes each, with the sets being disposed on opposite sides of the conductor rail group. Three of the collectors (not all in one set) function when the car is traveling in one direction along the rails, whereas the remaining three collectors function when the car has been turned around and is traveling in the opposite direction along the rails. The collecting of the 3-phase power is accomplished by having two collectors of one set engage two of the three rails on its side of the assembly, and having a collector of the other or opposite set engage a third rail which is on the other side of the assembly. The simple, stacked relation of the collectors in the sets is utilized, together with insulating tie bars and spring mountings and in conjunction with existing signal rails which can function as guides, to enable the required stroke or movements of the collectors to be reduced to a minimum whereby retracking at high speeds is possible with reasonably short pick-up guides. All six collectors can be retracked simultaneously, after which three separated collectors of the sets detrack since they will not be in use.

13 Claims, 11 Drawing Figures

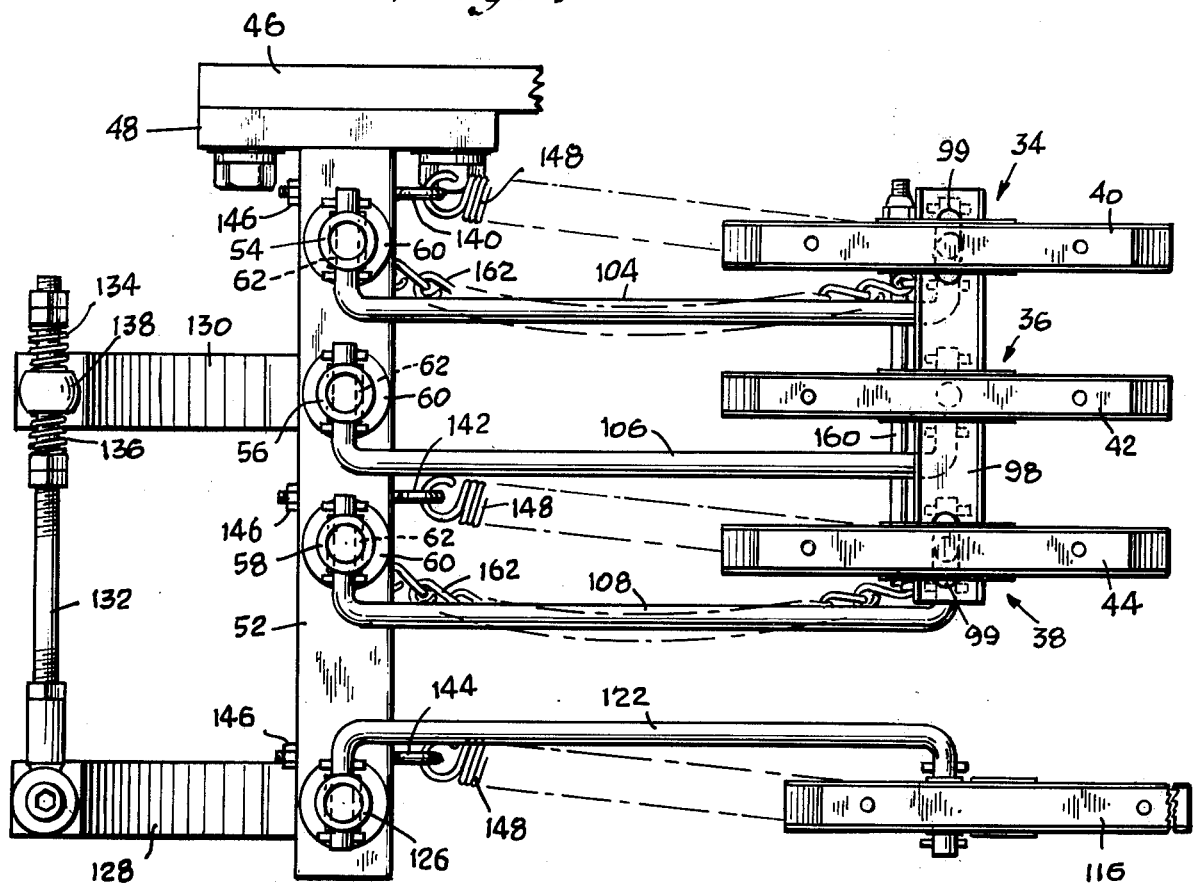

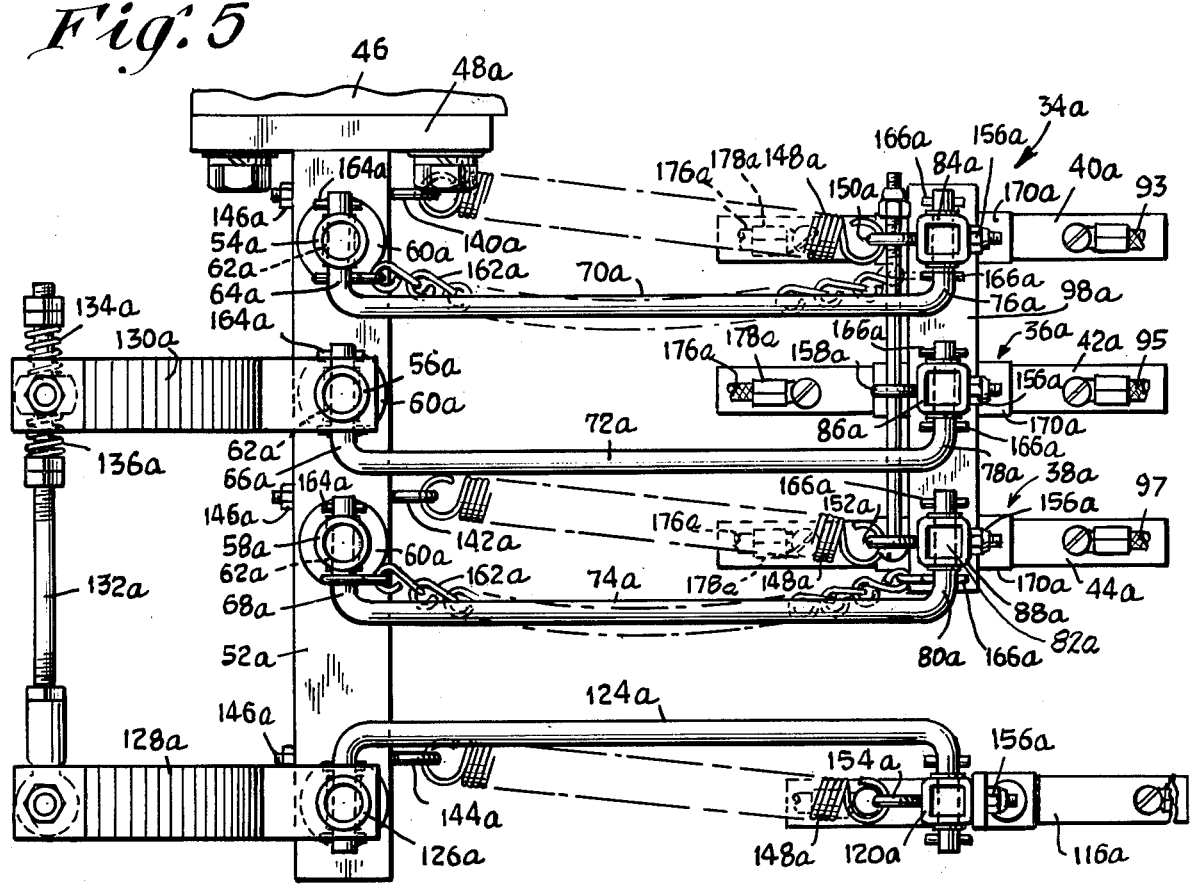

ELECTRIC CONDUCTOR SYSTEM FOR RAPID TRANSIT RAILWAYS

BACKGROUND OF THE INVENTION

This invention relates to electric power pick-up and supply systems for rapid transit railways and the like, and more particularly to the collector shoe arrangements and cooperable multiple conductor rails.

In the past, various types of collector shoes, arranged either singly or in multiples, have been proposed and utilized for electric railways. Single-circuit collectors are well known, for use with third rail systems to pick up power for the electric motors of railway cars. Such single phase systems have found wide-spread use in the past, but they do not compare favorably with 3-phase power equipment involving 3-phase motors which are notably more efficient and smaller in size than single phase machines.

Proposals have been made and employed, to utilize 3-phase power for railway and material-handling systems. Arrangements of this type require multiple power rails in addition to the rails or tracks engaged by the wheels of the cars or carriages. Where 3-phase power operates at high voltages there is required adequate spacing between the three power rails, and also from the rails to ground. As is well known, a delta or triangular disposition of 3-phase rails obtains the greatest separation for a given space. One proposed multiple-rail conductor system involved placing two power rails at one side of upright support members or stanchions and placing the third power rail on the other side of the support members so as to secure the desired delta configuration. With this proposal, the support members were located so as to be offset from the center line of the railway cars, and the latter carried sets of collector shoes which were in a simple delta configuration, for engagement with the conductor rails. To provide for operation of the cars in a forward direction even when turned around on the track, the cars were provided with duplicate sets of delta-configured collector shoes, one set being located to one side of the center line whereas the other set was located at the other side of the center line. Such a proposed arrangement was wasteful of space, and also resulted in a cramping of the collector shoe assemblages with the various related components. Additionally, the location of the power rails in an off-center position left something to be desired from the standpoint of flexibility. Besides this, there was encountered the problem of properly maintaining the unused set of collector shoes in properly oriented vertical position, in readiness for use when the occasion should require this.

Another problem encountered with the off-center live conductor rail system involved disposition of the power rails at switches and the like. A centralized arrangement of power rails can result in greater simplicity at those places where switches are encountered.

With prior proposals for multiple collector shoes involving offset power conductor rails it was necessary to provide for a relatively great stroke or operative movement of the shoes. When traversing switches, signal blocks and the like at high speeds the relatively great stroke required long pick-up or guide rails. The long ramps that were necessary required considerable additional space, and there also existed the possibility of cross-phasing and improper pick-up of the collector shoes.

SUMMARY OF THE INVENTION

The above disadvantages and drawbacks of prior multiple-phase electrification systems for high-speed railways are obviated by the present invention, which has for an object the provision of an improved multiple-phase collector system engageable with co-operable power rails, wherein a 3-phase delta-configured power rail can be centrally located instead of placed in an offset position, and wherein an improved arrangement of collector shoes is had that provides increased space for the required mounting and control components.

A related object of the invention is to provide an improved multiple-collector shoe arrangement in connection with the foregoing, which enables simplified power rail installations at switches and the like, and permits retracking of the shoes at relatively high speeds.

A feature of the invention resides in the provision of improved and simplified aligning means cooperable with the collector shoes, to prevent excessive tilting or misalignment of the same.

Still another feature of the invention involves the provision of an improved collector shoe organization wherein use is made to the best advantage, of the available space under the railway cars, to mount and control the shoes for a 3-phase system.

Yet another feature of the invention resides in the provision of an improved collector shoe system wherein a minimum amount of stroke or working movement of the shoes is required, and wherein relatively short ramps can be utilized even when dealing with high speeds of the cars, while at the same time there is avoided any bouncing or "sailing" of the shoes upon re-entry.

A further object of the invention is to provide, in a multiple power rail assemblage, improved fastening means between the rails and their supporting structure, enabling quick and easy dismounting and replacement of the rails while at the same time providing a secure anchorage for the same.

In accomplishing the above objects the invention provides a unique duplex conductor assemblage comprising two sets of stacked collector shoes adapted to engage a group of oppositely-faced live power rails which is centrally located. Each set comprises three shoes that are vertically spaced, the shoes of one set facing and being paired with those of the other set respectively. Carriers are provided, having means mounting the shoes for limited simultaneous vertical and horizontal movements and also swiveling motion, and mechanical control devices on the carriers connect respectively with the sets and normally position the shoes at a predetermined level. The control devices comprise other shoes engageable with signal or antenna rails of the electrification system. Unique pivot and actuator arms involving spindles and right-angle bearings, together with shoe mounting bars provide the necessary universal type movement to the shoes in an arrangement involving parallelogram configurations.

Other features and advantages of the invention involve the simplicity of the components and the rugged, durable construction which provides for a long, useful life over an extended period of time.

Still other features and advantages will hereinafter appear.

In the accompanying drawings, which illustrate one embodiment of the invention:

FIG. 4 is an opposite side elevational view of the set of stacked collector shoes, looking in the direction of the arrows 4—4 of FIG. 1.

FIG. 5 is a side elevational view of the other set of stacked collector shoes, looking in the direction of the arrows 5—5 of FIG. 1.

FIG. 6 is a top plan view of a novel rail support clip adapted for use with an upstanding rail support member, constructed in accordance with the present invention.

FIG. 7 is a front elevational view of the clip of FIG. 6.

FIG. 8 is a side elevational view of the clip of FIG. 6.

FIG. 9 is an end view of a rail support member adapted for use with clips of the type shown in FIGS. 6-8.

FIG. 10 is a view taken on line 10—10 of FIG. 9.

FIG. 11 is a view taken on line 11—11 of FIG. 9.

Figure 1:
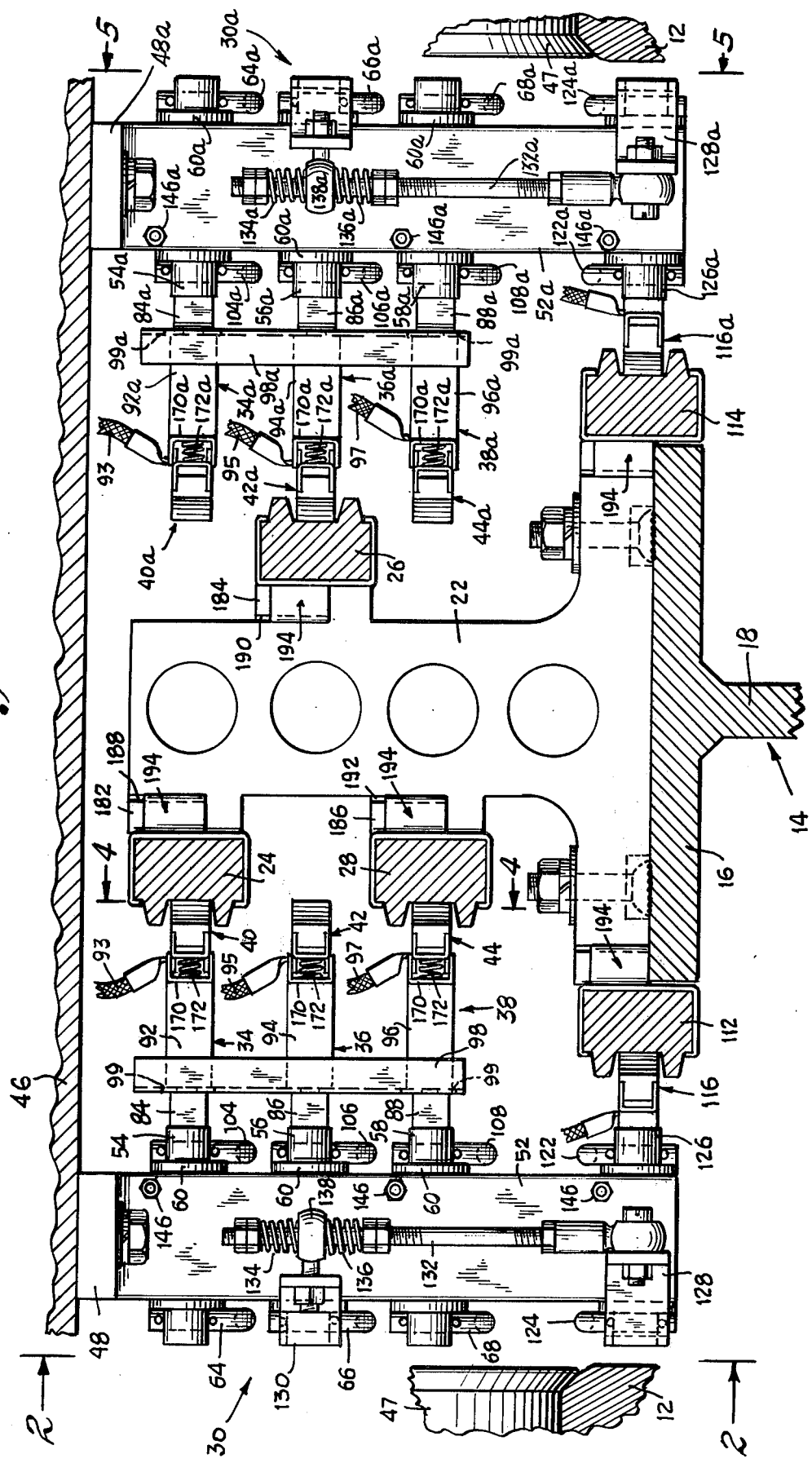
FIG. 1 is a front elevational view of the combination duplex collector shoe and delta-configured rail construction as provided by the invention, shown with portions of a railway car and track system.

Referring now to FIG. 1 there is shown an I-beam 14 which is adapted to be carried on the road bed between tracks 12 of a railway transit system, said beam comprising a horizontal top flange portion 16 and an upstanding web portion 18, the latter being adapted for engagement with guide disks or guide wheels (not shown) of a railway car, for centralizing and stabilizing the latter as it travels along the bed.

In accordance with the present invention there is disposed at a center location between the tracks 12 of the railway and above the I-beam 14 a rail support member 22 which can be of insulating material and which insulatedly carries three live conductor or power rails 24, 26 and 28 arranged in a delta or triangular formation and adapted to carry 3-phase power. The rails 24, 28 constitute a group disposed at one side of the support 22 in vertically spaced relation, whereas the remaining live rail 26 is at the other side of the support 22 and faces in an opposite direction, relative to the rail group 24, 28.

The rail support member 22 can be secured to the top flange 16 of the I-beam 14 in any suitable manner. The centralized location of the 3-phase power rail supply, comprising the support member 22 and delta-arranged live rails 24, 26 and 28 is unique with the present invention, the live rails being adapted for simultaneous engagement with two novel opposed sets 30, 30a of collector shoes, said sets being adapted for disposition and simultaneous operation at opposite sides of the support 22. Each set of collector shoes 30, 30a consists of three stacked shoe assemblages arranged in vertically spaced relation. The set of shoes 30 comprises shoe assemblages 34, 36 and 38 which include novel pivotal mounting means by which the shoes 40, 42 and 44 can have a universal type movement, that is, in both vertical and horizontal directions as well as being capable of a swivel action.

The set of shoes 30a is identical to the set 30 except that it is the mirror reverse thereof. A detailed description of only the set 30 follows, and identical numbers but with suffixes "a" are used to indicate similar components in the set 30a.

Referring to FIG. 1, the railway car is indicated by the numeral 46. Secured to the underside of the car 46 (which has the wheels 47) are mounting plates 48, 48a having depending carrier posts 52, 52a of rectangular, hollow cross section. Considering specifically the set 30 of collector shoes, the carrier post 52 turnably mounts three spindles 54, 56 and 58 which are located in a vertical row and bear in anti-friction bushings 60. The spindles 54–58 all project from both of the opposite sides of the post 52 and at their extremities (FIGS. 2-5) carry transverse anti-friction bushings or bearings 62 in which are accommodated angularly extending ends 64, 66 and 68 of three pivot arms 70, 72 and 74. The remaining or free ends of the pivot arms have angular portions 76, 78 and 80 which extend through anti-friction bushings 82 in three horizontal square-section bars 84, 86 and 88. The bars 84, 86 and 88 carry threaded studs 90 onto which are screwed nylon insulator blocks 92, 94 and 96 respectively, of square cross section. At the juncture of the insulator blocks and the bars there is located an alignment channel 98 whose web or yoke portion is apertured to enable the studs 90 to pass therethrough. The side flanges 100, 102 of the alignment channel 98 loosely engage opposite side surfaces of the insulator blocks 92, 94 and 96 and prevent the latter from turning any appreciable amount and unscrewing, although the fit is preferably loose to enable a limited swivel action to occur. As seen in FIGS. 1 and 4 the upper and lower apertures in the channel 98, indicated by the numeral 99, are in the form of slots which enable restricted relative vertical movement as between the uppermost and lowermost shoes 40, 44, and also with respect to the central shoe 42.

Pivotally mounted on the free ends of the insulator blocks 92, 94 and 96 are the collector shoes 40, 42 and 44.

In addition to the three pivot arms 70, 72 and 74 which swivel in corresponding end portions of the spindles 54, 56 and 58 there is a second and identical set of pivot arms 104, 106 and 108, which arms are pivotally carried on the other ends of the spindles 54–58 and extend parallel to the arms 70, 72 and 74. The free ends of the pivot arms 104, 106 and 108 are also accommodated in anti-friction bushings located in the horizontal bars 84, 86 and 88 whereby there are formed three parallelogram structures, each structure comprising two pivot arms, one spindle, and one square bar.

By virtue of the above construction it is seen that all six pivot arms 70–74 and 104–108 can swivel in the spindles which carry them, and that the spindles in turn can rotatably shift in the carrier post 52. The alignment channel 98 maintains, within limits, the spacing between the square bars 84–88, such spacing being preferably the same as the spacing between the spindles 54–58. In consequence, the collector shoes 40–44 can have both vertical and horizontal movement, and can also have a limited swiveling movement due to the loose fit of the insulator blocks 92–96 and the alignment channel 98.

It will now be understood that, in accordance with the present invention, where the sets of collector shoes 30, 30a are carried by a railway car for disposition at opposite sides of the live rail assemblage 24–28, the uppermost and lowermost shoes 40, 44 can engage the live rails 24, 28 respectively, and the intermediate shoe 42 can be free of any engagement, whereas in the set 30a the intermediate shoe 42a can engage the live rail 26 and the upper and lower shoes 40a, 44a can be free of any engagement. It will be understood that this is the preferred arrangement, and that instead the shoes 40, 42 can be engaged at one side, and the shoe 44 can be free whereas the shoe 44a in the set 30a can engage at the opposite side.

The shoes of the sets are paired with each other horizontally and in accordance with the invention the pairs are connected together by high capacity power cables 93, 95 and 97. Therefore, 3-phase power is derived from the rails 24, 26 and 28 by the duplex collector arrangement comprising the shoe sets 30, 32 as illustrated in FIG. 1. It will now be understood, as shown in FIG. 1, that the arrangement of staggered engagement involving two sets of collector shoes having three in each set, enables the delta configuration of the live rails 24, 26 and 28 to be centrally located between the road rails 12, providing equal ample space at both sides of the power rail configuration for the mounting and functioning of the sets of shoes 30, 30a. No cramping of the components occurs, and instead the sets of shoes can be constituted of full-size, well-constructed pivot arms, spindles and related bearings and control devices to effect a rugged construction which is reliable in its operation and easily serviced when necessary.

It can be understood, from an inspection of FIG. 1, that when the railway car 46 is reversed on the track so as to move forward in the opposite direction, this will be accompanied by a reverse positioning of the shoe sets 30, 30a whereby the upper and lower collector shoes 40a, 44a will be in engagement with the rails 24, 28 whereas the center collector shoe 42 will be in engagement with the lone center rail 26. Thus there is had a desirable flexibility, not only with respect to the direction of travel of the railway cars equipped with the power take-up of the present invention but also as a consequence of the symmetry of the collector shoe sets (made possible by the central disposition of the delta rail configuration).

In accordance with the present invention a control of the shoe sets 30, 30a is provided in the form of mechanical guide or control means mounted on the carrier posts 52 and 52a, for engagement with a signal or other rail section of the electrification system, to normally yieldably position the shoes of the sets at a predetermined level with respect to the carrier posts 52, 52a and car 46 or more particularly with respect to the power rails 24, 26 and 28. In accomplishing this, the rail carrier 22 is arranged to mount signal or antenna rails or rail sections 112, 114 facing in opposite directions and located below the delta configuration of the power rails. Engageable with the signal rails 112, 114 are shoes 116, 116a respectively. The shoe 116 is carried by an insulator block 118, in turn mounted on a square-section bar 120. The latter is pivotally connected with pairs of lower pivot arms 122, 124 which are also pivotally carried in the ends of a spindle 126 at the lower extremity of the carrier post 52. The bar 120, pivot arms 122, 124 and spindle 126 constitute a parallelogram-type pivot structure, this being equally true of the corresponding parts of the collector set 30a.

Figure 2:
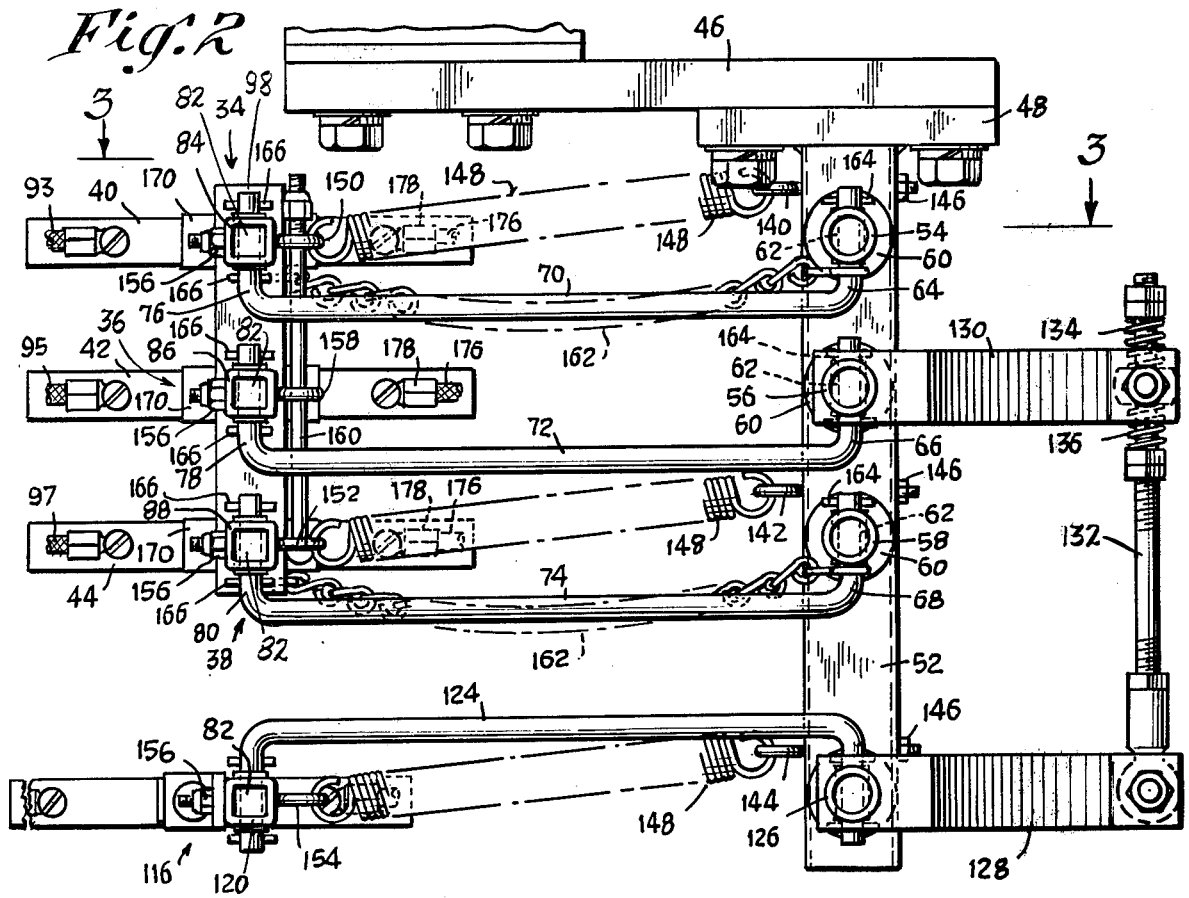
FIG. 2 is a side elevational view of one set of stacked collector shoes, looking in the direction of the arrows 2—2 of FIG. 1.

Referring to FIG. 2, the spindle 126 rigidly carries an actuator arm 128, and the spindle 56 rigidly carries a second actuator arm 130. The free extremities of the actuator arms 128, 130 are connected by a spring-charged control device comprising a link 132 which carries springs 134, 136 at its upper end, to engage an eye fitting 138 of the arm 130. The yieldable connection afforded by the springs 134, 136 constitutes a yieldable control for the three shoes 40, 42 and 44, under the dominance of the guide shoe 116 which travels along the channel-shaped signal rail 112. A like action is had for the collector set 30a.

It will now be understood that the collector shoes 116, 116a engaged by the signal rails 112, 114 respectively will maintain the power collector shoes 40-44 and 40a-44a in proper vertical orientation with respect to the power rails even though no engagement of the latter by the shoes occurs, as when the car is passing through switches, certain signal blocks and the like. Moreover, it will be observed that there is normally engagement of at least one shoe of a set 30, 30a with a power rail. Due to the above arrangement which effects a close and precise control of the collector shoes at all times, in conjunction with the unique pivotal and swivel mounting structures, the collector shoes need not have a large stroke or operative movement. Therefore, shorter guide ramps can be utilized than was heretofore possible.

As already stated above, whereas in FIG. 1 the shoes 40, 44 are engaging the rails 24, 28 respectively and the shoe 42a engages the rail 26, an alternate engagement would occur when the railway car is turned around on the tracks. In such event, the shoes 40a, 44a will engage the rails 24, 28 and the shoe 42 will engage the rail 26.

It can now be understood that the invention provides a unique organization by which 3-phase delta arranged power rails can be centrally located between the tracks and with respect to the railway cars, making available the ample space at each side of the delta arrangement for the accommodation of triple-shoe collector sets with the accompanying pivotal and swivel mountings therefor. Not only are the collector assemblages symmetrically disposed with respect to the center line, but such assemblages can be made up, in large part, of identical components arranged to give a mirror-opposite construction merely by changing the mountings on the carrier posts. Great flexibility is had, by virtue of the present invention, and the greatest advantage is taken of the available space below the railway car and at the track level.

Figure 3:
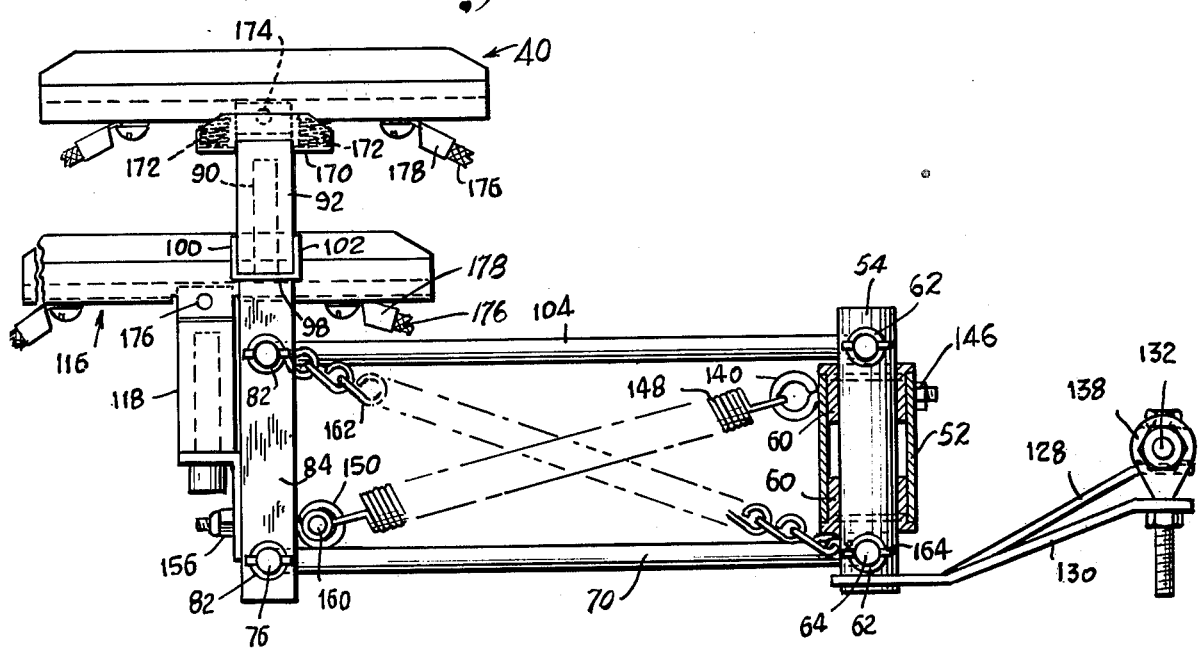
FIG. 3 is a top plan view of the set of stacked collector shoes of FIG. 2, as provided by the invention.

Referring to FIGS. 2-4, and in accordance with the present invention means are provided for biasing the shoe assemblages 34, 38 and 116 in a direction tending to oppose their weight, and in a second direction into engagement with the corresponding power rails 24, 28, the assemblage respectively. The depending post 52 is seen to carry a series of eyes 140, 142, 144, secured by suitable nuts 146. A series of springs 148 is provided, each spring having one end connected respectively with one of the eyes 140–144. The other ends of the springs are secured to additional eyes 150, 152, 154 which are carried respectively by the bars 84, 88 and 120. The eyes 150–154 are secured by means of nuts 156. In addition, the shoe assemblage 36 includes an eye 158; and an elongate restrainer rod 160 is provided to extend through the eyes 152, 158, 150. This tends to maintain the shoes 40–44 in vertical alignment with one another, eliminating the need for a spring on the intermediate shoe 42, while still providing a balanced biasing force to the assemblage consisting of the three shoes.

As particularly illustrated in FIGS. 2 and 3, the springs 148 lie along axes which are substantially parallel to one another, but which are skewed with respect to the depending post 52. Under such circumstances, the shoes 40–44 are biased in an upward direction when viewed in FIG. 1, in a direction which tends to oppose the downward force of their weight. In addition, the springs are so arranged as to maintain the engagement of the shoes 40, 44 with respect to the corresponding rails 24, 28.

Further, in accordance with the invention, there are provided two chains 162 which limit the swiveling movement of the assemblages 34–38 with respect to the depending post 52. As shown in FIG. 2, the uppermost chain 162 extends between the angular portion 64 of the pivot arm 70 and the opposite end of the parallel pivot arm 104. In accomplishing this, the angular portion 64 of the pivot arm 70 has a hole which receives an open portion of the last link of the chain 162. Similarly, the end of the pivot arm 104 is provided with a hole to receive a hook portion of the opposite end link of the chain 162.

Similarly, the end links of the lowermost chain 162 extend through holes respectively in the angularly extending end 68 of the pivot arm 74 and the opposite angularly extending end of the pivot arm 108. Such an arrangement limits the swiveling movement of the pivot arms 70–74 and 104–108 under the circumstance where the shoes 40–44 are free of the rails, as during turn-around of the car, etc.

As shown in FIGS. 2 and 3, the angularly extending ends of the pivot arms 70–74 are held captive in their corresponding spindles 54–58 by suitable pins 164. The opposite, angularly disposed ends of the pivot arms 70–74 are similarly secured by means of pins 166 in the corresponding bars 84–88. The pivot arms 104–108 are secured to their corresponding spindles and bars in a similar manner, as illustrated in FIG. 4.

As shown in FIGS. 1 and 3, the shoes 40–44 are pivotally connected to the insulating blocks 92–96, respectively. The ends of the insulating blocks 92–96 carry respective channel-like support members 170 each having a pair of springs 172 which engage the rear surface of the corresponding shoe. Pivot pins 174 extend through the shoes and the blocks 92–96 respectively, to enable limited swiveling movement of each shoe with respect to the corresponding block. The shoe 116 which constitutes part of the control means for the set 30 is pivotally carried on the insulator block 118 by means of a similar pivot pin 176.

Power connections from the various shoes can be made by means of additional high power electrical leads 176 extending from terminals 178 which are mounted under screws as shown. As mentioned above, the shoe 40 is electrically connected to the shoe 40a by a high capacity lead 93, the same being true of the shoes 42, 42a and 44, 44a using high-capacity leads 95 and 97.

Referring now to FIGS. 6–11, the invention provides a novel arrangement for mounting the rails 24, 26 and 28 in the delta configuration to the support 22. The support 22, in accomplishing this, is formed with outwardly extending lugs 182, 184 and 186 which, together with the member 22, define a series of oppositely-located vertical slots or tracks 188, 190, 192. A one-piece metal clip 194 is provided, preferably constituted as a single metal stamping, and having a channel-like cross-sectional configuration as shown in FIG. 8. The clip comprises a pair of leg portions 198, 200, and a connecting web portion 196, the ends of the legs 198, 200 being turned in as at 202, 204 to accommodate a power rail of the type shown in FIG. 1. As illustrated in FIG. 6, the clip further comprises a pair of rearwardly extending shoulders 206, 208 having inturned extremities 210, 212 respectively. As seen in FIGS. 1, 6, 9 and 10, the clip 194 when installed at the location and over the face of the lug 182 has its extremities 210, 212 received in the tracks 188. To prevent inadvertent removal or displacement, the lugs 182–186 each have beveled locking stops 214 which are bypassed by the shoulders 206–208 during installation of the clip 194 and which resist accidental dislodgement of the clip following such installation.

The above rail support arrangement has been found to provide highly satisfactory performance from the standpoint of quick assembly and simplicity of construction. The support member 22 can be readily molded of plastic, and the clips 194 fabricated as metal stampings.

The present rail construction and collector shoe arrangement cooperating therewith are seen to represent a distinct advance and improvement in the technology of railway systems. The greatest use is made of the space available, and the spacing between the collectors or shoes maximized whereby an easier and more effective physical control can be had of their positions and movements. Since the shoes are arranged in stacked relation, with two opposed sets of three each, the wasted space can be much less than with the conventional staggered spacing normally required for a delta-type rail group. The collecting of the 3-phase power is accomplished by having two collectors of one set engage two of the three rails on its side of the assembly, and having a collector of the other or opposite set engage a third rail which is on the other side of the assembly. It is noted that at least one conductor rail on each side is engaged by a collector, and the collectors not engaged are positioned in non-interfering locations with respect to the others and to the conductor rails, by those collectors which are engaged, due to the stacking arrangement. The preferred construction is to utilize the center collector of the said other or opposite set for engagement with the specified third conductor rail, and to have the extremity collectors of the first set engage the other two conductor rails. For travel of the car in one direction along the rails, only three specific collectors are operative, divided between the sets, whereas the other three collectors are inoperative and become operative when the car is turned around and travels in the opposite direction along the rails. The simple, stacked relation of the collectors in the sets is utilized, together with insulating tie bars and spring mountings and in conjunction with existing signal rails which can function as guides, to enable the required stroke or movements of the collectors to be reduced to a minimum whereby retracking at high speeds is possible with reasonably short pickup guides. All six collectors can be retracked simultaneously, after which three separated collectors of the sets detrack since they will not be in use. The detracked collectors carry voltage but remain in spaced relationship to the conductor rails at all times, by virtue of the simple stacking arrangement and mountings therefor.

The collectors of each set are maintained in vertical array, when not engaging conductors, by the illustrated control device having a shoe constantly engaged in a grooved track disposed parallel to the conductor rails. This enables a retracking scoop to be fitted into a compact space and minimizes the necessity for vertical guidance into the grooves of the power rails. The shoes and grooved track can be components of a control or signal system for the railway.

Variations and modifications are possible without departing from the spirit of the invention.

I claim:

1. A duplex power supplying means for use with a rail electrification system, comprising in combination:
   (a) two sets of stacked collector shoes adapted for engagement with oppositely facing, live power rails of the electrification system,
   (b) said sets of shoes being disposed horizontally opposite and in spaced relation to each other,
   (c) each set comprising three shoes located in vertically spaced relation,
   (d) the shoes of one set being respectively horizontally paired with and facing those of the other set,
   (e) high-capacity electrical power connections between the respective shoes of the pairs,
   (f) a carrier and means mounting the shoes of the sets respectively on the carrier for limited, simultaneous vertical movement,
   (g) a delta-configuration 3-rail, power rail assemblage disposed between said sets of collector shoes,
   (h) two rails of said assemblage facing one set of collector shoes and being engaged respectively by two of said shoes, and
   (i) the remaining rail of said assemblage facing the other set of collector shoes and being engaged by that one of said shoes which is not electrically connected to said two shoes by said high-capacity power connections.

2. The invention as defined in claim 1, wherein:
   (a) the power rail assemblage comprises a support member and three power rails carried thereby,
   (b) a pair of tracks for a railway car, and
   (c) means mounting said support member substantially midway between said tracks.

3. The invention as defined in claim 2, wherein:
   (a) said carrier comprises a railway car having wheels engaged with said tracks.

4. The invention as defined in claim 3, and further including:
   (a) mechanical control devices mounted on the carrier and connected respectively with said sets, said control devices being engageable with rail sections of the electrification system, and normally yieldably positioning the shoes of the sets at a predetermined level on the carrier.

5. The invention as defined in claim 3, wherein:
   (a) said support member comprises an upright support stanchion constituted of electrically insulating material and having means for securing it to a supporting surface,
   (b) said stanchion having lugs projecting from its sides, provided with vertically-extending, oppositely-disposed tracks,
   (c) a plurality of carrier clips including pairs of retainer shoulders adapted to engage the tracks of the support lugs of the stanchion in response to downward movement of the clips over the faces of the stanchion lugs, and
   (d) cooperable stop means on the carrier clips and stanchion, to limit the downward movement of the clips so as to maintain the shoulders thereof operatively engaged with the tracks of the stanchion lugs.

6. In a power rail system for electric railways, in combination:
   (a) an upright support stanchion constituted of electrically insulating material and having means for securing it to a supporting surface,
   (b) said stanchion having a support lug projecting from one of its sides, provided with vertically-extending, oppositely-disposed tracks,
   (c) a carrier clip having means for gripping and holding a conductor rail, said carrier clip including a pair of retainer shoulders adapted to engage the tracks of the support lug of the stanchion in response to downward movement of the clip over the face of the stanchion lug, and
   (d) cooperable stop means on the carrier clip and stanchion, to limit the downward movement of the clip so as to maintain the shoulders thereof operatively engaged with the track of the stanchion lug.

7. The invention as defined in claim 6, and further including:
   (a) cooperable interlocking means on the stanchion lug and the carrier clip, normally preventing removal of the latter in an upward direction from the lug.

8. The invention as defined in claim 7, wherein:
   (a) said interlocking means comprises beveled stops on the stanchion lug, for engagement with the shoulders of the carrier clip,
   (b) said shoulders of the carrier clip being resilient to enable them to be spread apart and avoid said beveled stops when the carrier clip is shifted upward with respect to the stanchion lug.

9. A conductor assemblage for use with a rail electrification system, comprising in combination:
   (a) a set of vertically stacked collector shoes adapted for engagement with a group of vertically stacked live power rails of the electrification system,
   (b) said set comprising three shoes located in vertically spaced relation and adapted for disposition in horizontally opposite locations with respect to the group of live power rails,
   (c) a carrier,
   (d) means mounting the set of shoes on the carrier for limited, simultaneous vertical movement,
   (e) a mechanical control device mounted on the carrier and connected with said set of shoes, said control device being engageable with a rail section of the electrification system and normally yieldably positioning the shoes of the set at a predetermined level on the carrier,
   (f) an alignment channel member extending between and connected to the mounting means for the shos, and
   (g) cooperable means on said mounting means and alignment channel member, limiting swiveling movement of the shoes.

10. A conductor assemblage as in claim 9, and further including:
    (a) cooperable means on said alignment channel member and shoe-mounting means, providing lost-motion connections which limit relative vertical movement between the shoes.

11. A conductor assemblage for use with a rail electrification system, comprising in combination:
    (a) a set of vertically stacked collector shoes adapted for engagement with a group of vertically stacked live power rails of the electrification system,
    (b) said set comprising three shoes located in vertically spaced relation and adapted for disposition in horizontally opposite locations with respect to the group of live power rails,
    (c) a carrier, (d) means mounting the set of shoes on the carrier for limited, simultaneous vertical movement, (e) a mechanical control device mounted on the carrier and connected with said set of shoes, said control device being engageable with a rail section of the electrification system and normally yieldably positioning the shoes of the set at a predetermined level on the carrier, (f) said shoe-mounting means comprising pairs of pivot arms, and comprising bars pivotally connected with said arms and carrying said shoes, and (g) a restrainer rod and means loosely connecting the same to said bars to limit relative movement of the latter.

12. A conductor assemblage for use with a rail electrification system, comprising in combination:

(a) a set of vertically stacked collector shoes adapted for engagement with a group of vertically stacked live power rails of the electrification system, (b) said set comprising three shoes located in vertically spaced relation and adapted for disposition in horizontally opposite locations with respect to the group of live power rails, (c) a carrier, (d) means mounting the set of shoes on the carrier for limited, simultaneous vertical movement, (e) a mechanical control device mounted on the carrier and connected with said set of shoes, said control device being engageable with a rail section of the electrification system and normally yieldably positioning the shoes of the set at a predetermined level on the carrier, (f) said mechanical control device comprising an additional collector shoe, for engagement with said rail section of the electrification system, (g) means mounting the additional shoe for limited vertical movement, (h) a linkage means connected between the additional shoe and the shoes of the set, (i) a group of vertically-stacked live power rails engageable with said stacked collector shoes, (j) an additional rail engageable with said additional collector shoe, and (k) means rigidly connecting said additional rail to said group of vertically-stacked live power rails.

13. A duplex power supplying means for use with a rail electrification system, comprising in combination:

(a) two sets of stacked collector shoes adapted for engagement with oppositely facing, live power rails of the electrification system, (b) said sets of shoes being disposed horizontally opposite and in spaced relation to each other, (c) each set comprising three shoes located in vertically spaced relation, (d) the shoes of one set being respectively horizontally paired with and facing those of the other set, (e) a carrier and means mounting the shoes of the sets respectively on the carrier for limited, simultaneous vertical movement, (f) a delta-configuration 3-rail power rail assemblage disposed along the center line of said rail system and between said sets of collector shoes, (g) two rails of said assemblage facing one set of collector shoes and being engaged respectively by two shoes of said one set, and (h) the remaining rail of said assemblage facing the other set of collector shoes and being engaged by that shoe of said other set which is horizontally paired with the shoe of said one set not engaged by a rail of said assemblage.

* * * * *